(12) United States Patent
Golobokov et al.

(10) Patent No.: US 12,149,489 B2
(45) Date of Patent: Nov. 19, 2024

(54) TECHNIQUES FOR RECOMMENDING REPLY STICKERS

(71) Applicant: Snap Inc., Santa Monica, CA (US)

(72) Inventors: Roman Golobokov, London (GB); Sergey Smetanin, London (GB); Sofya Savinova, Lehi, UT (US); Aleksandr Zakharov, Dubai (AE)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/183,794

(22) Filed: Mar. 14, 2023

(65) Prior Publication Data

US 2024/0314091 A1     Sep. 19, 2024

(51) Int. Cl.
*H04L 51/04* (2022.01)
*G06F 3/04842* (2022.01)
(Continued)

(52) U.S. Cl.
CPC .......... *H04L 51/04* (2013.01); *G06F 3/04842* (2013.01); *G06N 20/00* (2019.01); *H04L 51/10* (2013.01); *H04L 51/52* (2022.05)

(58) Field of Classification Search
CPC ......... H04L 51/04; H04L 51/10; H04L 51/52; G06F 3/04842; G06N 20/00
See application file for complete search history.

(56) References Cited

U.S. PATENT DOCUMENTS

| | | |
|---|---|---|
| 5,604,843 A | 2/1997 | Shaw et al. |
| 5,689,559 A | 11/1997 | Park |

(Continued)

FOREIGN PATENT DOCUMENTS

| | | |
|---|---|---|
| CN | 109863532 A | 6/2019 |
| CN | 110168478 A | 8/2019 |

(Continued)

OTHER PUBLICATIONS

"U.S. Appl. No. 18/209,130, Non Final Office Action mailed Oct. 19, 2023", 12 pgs.

(Continued)

*Primary Examiner* — Jeong S Park
(74) *Attorney, Agent, or Firm* — SCHWEGMAN LUNDBERG & WOESSNER, P.A.

(57) ABSTRACT

Described herein is a technique for processing a received media content item (e.g., a message), received at a messaging application of a first end-user of a messaging service, to generate a selection of some predetermined number of recommended stickers. The recommended stickers are then presented in a user interface to the first end-user, allowing the first end-user to select a sticker for use in replying to the received media content item. To generate the selection of recommended stickers, in response to receiving the media content item, the messaging application processes the media content item to identify specific attributes and characteristics (e.g., text included with the message, stickers used with the message, and other contextual metadata). The identified attributes and characteristics of the received message are then processed by a scoring model to identify the predetermined number of stickers for presenting in the reply interface as recommended reply stickers.

20 Claims, 10 Drawing Sheets

(51) Int. Cl.
  *G06N 20/00* (2019.01)
  *H04L 51/10* (2022.01)
  *H04L 51/52* (2022.01)

(56) References Cited

U.S. PATENT DOCUMENTS

| | | | |
|---|---|---|---|
| 5,880,731 | A | 3/1999 | Liles et al. |
| 6,023,270 | A | 2/2000 | Brush, II et al. |
| RE36,919 | E | 10/2000 | Park |
| RE37,052 | E | 2/2001 | Park |
| 6,223,165 | B1 | 4/2001 | Lauffer |
| 6,650,793 | B1 | 11/2003 | Lund et al. |
| 6,772,195 | B1 | 8/2004 | Hatlelid et al. |
| 6,804,417 | B1 | 10/2004 | Lund et al. |
| 6,842,779 | B1 | 1/2005 | Nishizawa |
| 7,342,587 | B2 | 3/2008 | Danzig et al. |
| 7,468,729 | B1 | 12/2008 | Levinson |
| 7,636,755 | B2 | 12/2009 | Blattner et al. |
| 7,639,251 | B2 | 12/2009 | Gu et al. |
| 7,775,885 | B2 | 8/2010 | Van Luchene et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 8,088,044 | B2 | 1/2012 | Tchao et al. |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,146,005 | B2 | 3/2012 | Jones et al. |
| 8,151,191 | B2 | 4/2012 | Nicol |
| RE43,993 | E | 2/2013 | Park |
| 8,384,719 | B2 | 2/2013 | Reville et al. |
| RE44,054 | E | 3/2013 | Kim |
| RE44,068 | E | 3/2013 | Park |
| RE44,106 | E | 3/2013 | Park |
| 8,396,708 | B2 | 3/2013 | Park et al. |
| RE44,121 | E | 4/2013 | Park |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,581,911 | B2 | 11/2013 | Becker et al. |
| 8,597,121 | B2 | 12/2013 | del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,890,926 | B2 | 11/2014 | Tandon et al. |
| 8,892,999 | B2 | 11/2014 | Nims et al. |
| 8,924,250 | B2 | 12/2014 | Bates et al. |
| 8,963,926 | B2 | 2/2015 | Brown et al. |
| 8,989,786 | B2 | 3/2015 | Feghali |
| 9,086,776 | B2 | 7/2015 | Ye et al. |
| 9,105,014 | B2 | 8/2015 | Collet et al. |
| 9,241,184 | B2 | 1/2016 | Weerasinghe |
| 9,256,860 | B2 | 2/2016 | Herger et al. |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,402,057 | B2 | 7/2016 | Kaytaz et al. |
| 9,412,192 | B2 | 8/2016 | Mandel et al. |
| 9,460,541 | B2 | 10/2016 | Li et al. |
| 9,489,760 | B2 | 11/2016 | Li et al. |
| 9,503,845 | B2 | 11/2016 | Vincent |
| 9,508,197 | B2 | 11/2016 | Quinn et al. |
| 9,532,364 | B2 | 12/2016 | Fujito |
| 9,544,257 | B2 | 1/2017 | Ogundokun et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,648,376 | B2 | 5/2017 | Chang et al. |
| 9,697,635 | B2 | 7/2017 | Quinn et al. |
| 9,706,040 | B2 | 7/2017 | Kadirvel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,155,168 | B2 | 12/2018 | Blackstock et al. |
| 10,158,589 | B2 | 12/2018 | Collet et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,348,662 | B2 | 7/2019 | Baldwin et al. |
| 10,362,219 | B2 | 7/2019 | Wilson et al. |
| 10,432,559 | B2 | 10/2019 | Baldwin et al. |
| 10,454,857 | B1 | 10/2019 | Blackstock et al. |
| 10,475,225 | B2 | 11/2019 | Park et al. |
| 10,504,266 | B2 | 12/2019 | Blattner et al. |
| 10,573,048 | B2 | 2/2020 | Ni et al. |
| 10,656,797 | B1 | 5/2020 | Alvi et al. |
| 10,657,695 | B2 | 5/2020 | Chand et al. |
| 10,657,701 | B2 | 5/2020 | Osman et al. |
| 10,659,405 | B1 | 5/2020 | Chang et al. |
| 10,762,174 | B2 | 9/2020 | Denton et al. |
| 10,805,248 | B2 | 10/2020 | Luo et al. |
| 10,872,451 | B2 | 12/2020 | Sheth et al. |
| 10,880,246 | B2 | 12/2020 | Baldwin et al. |
| 10,895,964 | B1 | 1/2021 | Grantham et al. |
| 10,896,534 | B1 | 1/2021 | Smith et al. |
| 10,933,311 | B2 | 3/2021 | Brody et al. |
| 10,938,758 | B2 | 3/2021 | Allen et al. |
| 10,964,082 | B2 | 3/2021 | Amitay et al. |
| 10,979,752 | B1 | 4/2021 | Brody et al. |
| 10,984,575 | B2 | 4/2021 | Assouline et al. |
| 10,992,619 | B2 | 4/2021 | Antmen et al. |
| 11,010,022 | B2 | 5/2021 | Alvi et al. |
| 11,030,789 | B2 | 6/2021 | Chand et al. |
| 11,036,781 | B1 | 6/2021 | Baril et al. |
| 11,063,891 | B2 | 7/2021 | Voss |
| 11,069,103 | B1 | 7/2021 | Blackstock et al. |
| 11,080,917 | B2 | 8/2021 | Monroy-hernández et al. |
| 11,128,586 | B2 | 9/2021 | Al Majid et al. |
| 11,188,190 | B2 | 11/2021 | Blackstock et al. |
| 11,189,070 | B2 | 11/2021 | Jahangiri et al. |
| 11,199,957 | B1 | 12/2021 | Alvi et al. |
| 11,218,433 | B2 | 1/2022 | Baldwin et al. |
| 11,229,849 | B2 | 1/2022 | Blackstock et al. |
| 11,245,658 | B2 | 2/2022 | Grantham et al. |
| 11,249,614 | B2 | 2/2022 | Brody |
| 11,263,254 | B2 | 3/2022 | Baril et al. |
| 11,270,491 | B2 | 3/2022 | Monroy-Hernández et al. |
| 11,284,144 | B2 | 3/2022 | Kotsopoulos et al. |
| 11,502,983 | B2 * | 11/2022 | Heikkinen ............ H04W 4/12 |
| 2002/0067362 | A1 | 6/2002 | Agostino Nocera et al. |
| 2002/0169644 | A1 | 11/2002 | Greene |
| 2005/0162419 | A1 | 7/2005 | Kim et al. |

(56) References Cited

U.S. PATENT DOCUMENTS

| | | |
|---|---|---|
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0046423 A1* | 2/2015 | Weeks ............... G06F 16/951 707/708 |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0083898 A1* | 3/2018 | Pham ..................... G06F 40/56 |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0280997 A1 | 9/2019 | Baldwin et al. |
| 2020/0259948 A1* | 8/2020 | Keohane ........... H04M 1/72463 |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0383251 A1* | 12/2021 | Osborn ..................... G06N 5/04 |
| 2021/0385179 A1* | 12/2021 | Heikkinen .............. H04W 4/12 |
| 2021/0385180 A1 | 12/2021 | Al Majid et al. |
| 2021/0397645 A1 | 12/2021 | Wang et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0269733 A1* | 8/2022 | Li ....................... G06F 16/9535 |
| 2022/0337540 A1 | 10/2022 | Bayer et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

(56) References Cited

OTHER PUBLICATIONS

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

Kuhn, Steve, "How To Send Stickers on Snapchat?", ITGeared, [Online]. Retrieved from the Internet: <URL: https://www.itgeared.com/how-to-send-stickers-on-snapchat/>, (Aug. 31, 2022), 6 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

"U.S. Appl. No. 18/209,130, Response filed Jan. 17, 2024 to Non Final Office Action mailed Oct. 19, 2023", 11 pgs.

"U.S. Appl. No. 18/209,130, Final Office Action mailed Feb. 20, 2024", 15 pgs.

"U.S. Appl. No. 18/209,130, Response filed Apr. 22, 2024 to Final Office Action mailed Feb. 20, 2024", 11 pgs.

\* cited by examiner

TECHNIQUES FOR RECOMMENDING REPLY STICKERS

TECHNICAL FIELD

The present disclosure relates to techniques for generating recommended "smart" sticker replies in the context of an online messaging application and service that facilitates one-to-one and one-to-many messaging and content sharing, using content incorporating a variety of media formats. More specifically, the present disclosure describes a technique that is used to generate a model (e.g., a machine learning model) that can be used to generate relevance scores for stickers, which, when presented to a message recipient in a reply interface, can be selected by the message recipient for use in replying to a received message or media content item.

BACKGROUND

Advances in a variety of computer-related technologies have given rise to a variety of online or Internet-based messaging applications. Traditional messaging systems and applications, including e-mail and text messaging, are quickly being replaced with new messaging applications that provide for generating and communicating with rich content—i.e., content that incorporates a variety of different media formats, including text, audio, graphics, images, photographs, video and effects. One specific media format that has become increasingly popular with modern messaging applications and services is the digital sticker, more frequently referred to simply as a sticker. A sticker is a graphic, icon, or image, similar in concept to an emoji. However, stickers differ from emojis in that stickers generally do not correspond with and represent a predetermined symbol. For instance, whereas emojis are part of a standardized character coding system (e.g., the Unicode Standard), stickers generally are not part of any standardized character coding system. Accordingly, an implementation of a sticker system provides significantly greater flexibility in creating customized and personalized stickers that are more expressive and engaging than traditional emoji. In fact, because a messaging application may have considerably more stickers than any conventional emoji set, it may be difficult for end-users to identify appropriate stickers when generating a message to be communicated with one or more other end-users.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which.

DETAILED DESCRIPTION

Figure 1:
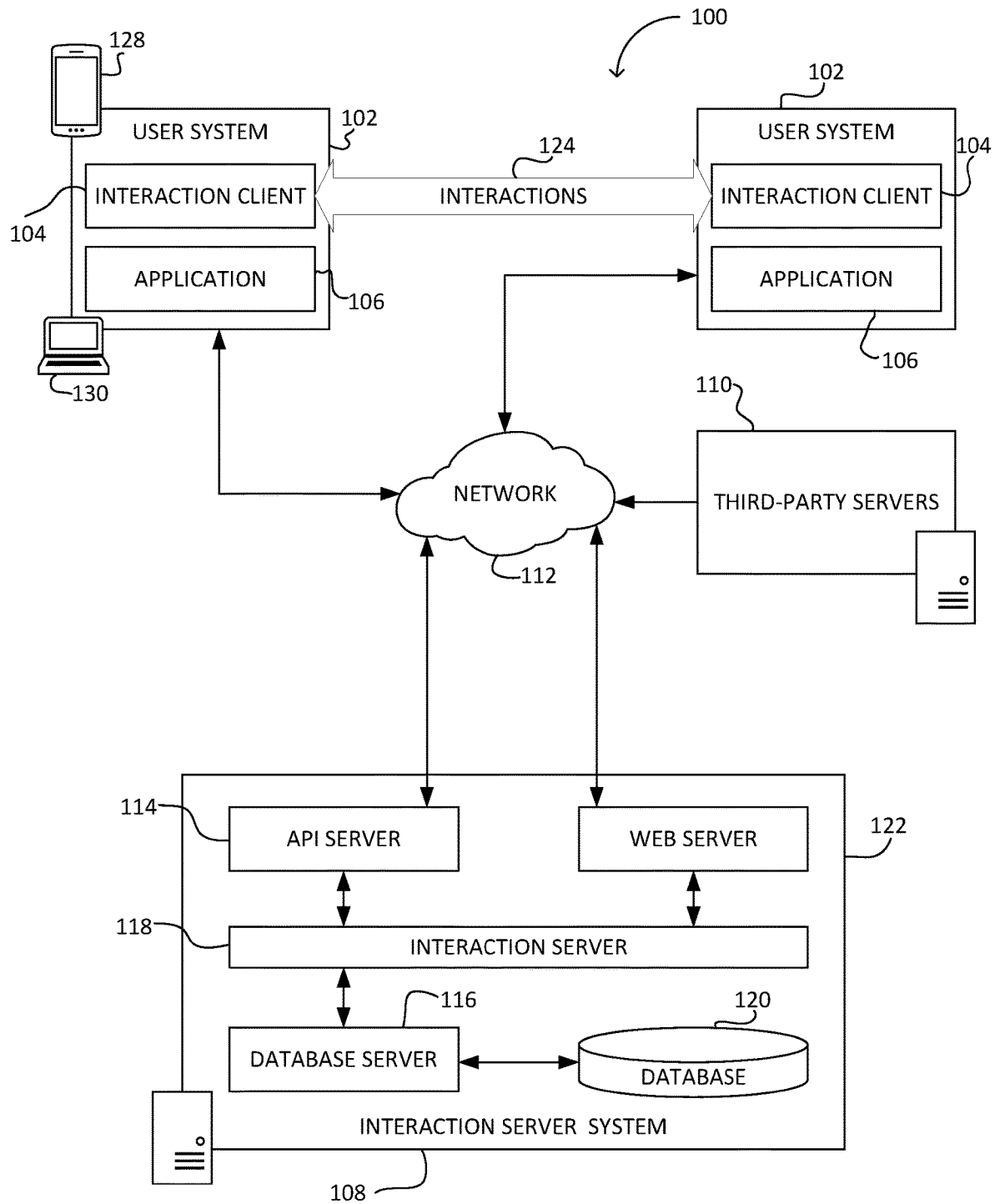
FIG. 1 is a diagrammatic representation of a client/server network-based environment in which a messaging application and service, having a smart sticker reply recommendation feature, according to some examples, may be deployed.

Described herein are techniques for generating a model (e.g., a machine learning model) that is used to derive relevance scores for digital stickers that may be appropriate for use in a reply message. Specifically, when a message recipient, as an end-user of a messaging application, receives and views a message, various attributes and characteristics of the received message, and in some instances, various attributes and characteristics of the sender of the message and/or the recipient of the message, are provided as inputs to the pre-trained model. The model outputs relevance scores that are used to determine appropriate stickers that the message recipient may select for use in a creating and sending a reply message. Accordingly, the messaging application will present a user interface-referred to herein as a reply interface-via which a selection of recommended stickers is presented, allowing the message recipient to select a sticker from the recommended stickers for use as, or with, a reply message. In the following description, for purposes of explanation, numerous specific details and features are set forth in order to provide a thorough understanding of the various aspects of different examples. It will be evident, however, to one skilled in the art, that the present invention may be practiced and/or implemented with varying combinations of the many details and features presented herein.

For purposes of the present disclosure, the terms "message" and "media content item" are used synonymously. As will be readily apparent from the description of the various figures that follow, a message or media content item may consist of various component parts—that is, individual content items, including for example, text, audio, graphics, images, photographs, video and effects. Many messaging applications provide for the exchange of messages in both a one-to-one (e.g., direct messaging) context, as well as one-to-many. In the case of one-to-many messaging, a messaging application may allow a message sender to specify or select multiple message recipients to receive a message. Similarly, some messaging applications support a feature that has become known within the realm of social media as "stories." A story is specific type of message that is usually a collection of images or videos divided into several short sequences. A story may be accompanied by backgrounds, music, audio, texts, stickers, animations, effects and emojis. Generally, the aim of posting a story is to tell a narrative (e.g., an everyday experience) or to convey a message. In many instances, once a story has been posted, the story may not be editable and may only be available for viewing by others for a short time (e.g., twenty-four hours). With many messaging applications, content creation tools may allow a content creator to add a hashtag or specify a location to provide further context for a story. The visibility of the story—that is, the audience of possible viewers—may be determined by a social graph defining a network of connected end-users. Alternatively, the content creator may specify that a story is to have a public audience, in which case the story may be viewed by any end-user of the messaging application.

In creating a message, whether it be a direct message or a message posted to a content feed, or posted as a story, content creators may add to the content of the message one or more digital stickers. Typically, the stickers are maintained and managed by a sticker system that is part of, or otherwise associated with, the messaging application and service. In some instances, a sticker may be customized or personalized, for instance, to reflect characteristics of the content creator. For example, a sticker may comprise an avatar that has been configured by an end-user to convey a likeness of the end-user of the messaging application. Similarly, a sticker may be customized to reflect an attribute or characteristic of a location from which a message is being created and shared, or an event occurring at the time the message is being created and shared. Accordingly, customized and/or personalized stickers help content creators to better convey their message and improve overall engagement.

When a message recipient is viewing a received message, the message recipient may desire to generate a reply message. Consistent with some examples, a machine learning model is trained to generate relevance scores that may be used in selecting some predetermined number of recommended stickers that a message recipient may use in a reply message. For example, when a message recipient is viewing a received message, a reply interface may be presented with the message the end-user is viewing, such that a set of recommend stickers are presented with the reply interface, allowing the end-user an opportunity to quickly select and send a sticker as a response or reply to the message that the end-user is viewing. As such, described examples generally involve two stages-a first stage referred to herein as a training stage, during which a machine learning model is trained to generate the relevance scores that are used to select stickers that are to be recommended for use in replying to a message- and, a second stage, referred to herein as the inference stage, during which a received message being viewed by a message recipient is analyzed for purposes of identifying attributes and characteristics that are then used as inputs to the pre-trained model, which infers or predicts recommended reply stickers.

Consistent with some examples, the machine learning model is a pre-trained model, trained using a supervised machine learning algorithm, with training data that reflects historical end-user behavior with respect to selecting reply stickers. For example, consistent with some examples, for some period of time, each time a message recipient selects a sticker to use as a reply to a received message, attributes and characteristics of the received message, attributes and characteristics of the sender of the message, and attributes and characteristics of the recipient of the message may be captured and stored for subsequent use as a single instance of training data. Once a sufficient volume of training data has been obtained, the training data can be used to train the machine learning model to generate relevance scores for stickers. In this way, the sticker recommendations that are derived by the model are learned, in the sense that the recommendations are derived based on actual observed historical data. By way of example, if a specific sticker is frequently selected for use as a reply message when the sender of the message is in a specific location, this behavior is reflected in the training data and the model will be trained to recommend the specific sticker under the correct circumstances—e.g., when the sender of the message is located in the specific location at the time of sending the original message.

Consistent with some examples, the sticker system of the messaging service may maintain a classification system for the stickers, such as a taxonomy, or a hierarchy of categories or tags, used to organize and maintain the inventory of stickers. Accordingly, at least with some examples, the pre-trained machine learning model may be a classifier and may generate a relevance score for each of several categories or tags, such that stickers that are associated with the highest scoring categories or tags can be selected for presenting to a message recipient as recommended reply stickers. By way of example, various stickers may convey a message relating to a holiday—e.g., "Happy Holidays," "Merry Christmas," or "Happy St. Paddy's Day." These stickers may then be associated with or assigned to a tag (e.g., a holiday tag), indicating that the stickers are associated with a holiday. When an end-user receives a message, the various attributes and characteristics of the message, the sender, and the recipient of the message, are provided as input to the pre-trained machine learning model. If the category or tag for holidays receives a high relevance score as output by the machine learning model, then one or more of the stickers assigned to that category or tag may be selected for presenting to an end-user as a recommended reply sticker.

When compared to some conventional sticker recommendation techniques, described examples are technically advantageous in that the innovative techniques described herein allow for identifying or learning latent end-user preferences and behaviors. For example, because the pre-trained model is trained with historical data reflecting prior end-user sticker selections in the context of generating reply messages, the past behavior of end-users will be reflected in the relevance scores that are generated by the model. This provides for a better end-user experience, as the stickers that are recommended for use in replying to a message will generally be more relevant than if the stickers were randomly selected. Furthermore, as end-user's behaviors change over time, the model can be iteratively re-trained and improved to capture new trends and behaviors, without having to manually manipulate selection rules that may be used in a rule-based selection technique. Many other advantages of the present inventive subject matter will be readily apparent to those skilled in the art from the description of the several figures that follows.

Networked Computing Environment

FIG. 1 is a block diagram showing an example interaction system 100 for facilitating interactions (e.g., exchanging messages or media content items, conducting text, audio and video-based calls, playing games, and/or viewing content) over a network 112. The interaction system 100 includes multiple user systems 102, each of which hosts multiple applications, including an interaction client 104 (which may be a messaging client), and other applications 106. Each interaction client 104 is communicatively coupled, via one or more communication networks including a network 112 (e.g., the Internet), to other instances of the interaction client 104 (e.g., hosted on respective other user system 102), an interaction server system 108 and third-party servers 110). An interaction client 104 can also communicate with locally hosted applications 106 using Applications Programming Interfaces (APIs).

An interaction client 104 interacts with other interaction clients 104 and with the interaction server system 108 via the network 112. The data exchanged between the interaction clients 104 (e.g., interactions 124) and between the interaction clients 104 and the interaction server system 108 includes functions (e.g., commands to invoke functions) and payload data (e.g., text, audio, video, or other multimedia data). These functions and their respective payloads may be communicated via various communication protocols.

The interaction server system 108 provides server-side functionality via the network 112 to the interaction clients 104. While certain functions of the interaction system 100 are described herein as being performed by either an interaction client 104 or by the interaction server system 108, the location of certain functionality either within the interaction client 104 or the interaction server system 108 may be a design choice. For example, it may be technically preferable to initially deploy particular technology and functionality within the interaction server system 108 but to later migrate this technology and functionality to the interaction client 104 where a user system 102 has sufficient processing capacity.

The interaction server system 108 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 108, an API server 114 is coupled to and provides programmatic interfaces to interaction servers 118, making the functions of the interaction servers 118 accessible to interaction clients 104, other applications 106 and third-party servers 110. The interaction servers 118 are communicatively coupled to a database server 116, facilitating access to a database 120 that stores data associated with interactions processed by the interaction servers 118. Similarly, a web server 122 is coupled to the interaction servers 118 and provides web-based interfaces to the interaction servers 118. To this end, the web server 122 processes incoming network requests over the Hypertext Transfer Protocol (HTTP) and several other related protocols.

The API server 114 receives and transmits interaction data (e.g., commands and message payloads) between the interaction servers 118 and the user systems 102 (and for example, interaction clients 104 and other application 106) and the third-party servers 110. Specifically, the Application Programming Interface (API) server 114 provides a set of interfaces (e.g., routines and protocols) that can be called or queried by the interaction client 104 and other applications 106, including third-party applications, to invoke functionality of the interaction servers 118. The API server 114 exposes various functions supported by the interaction servers 118, including account registration, login functionality, the sending of interaction data via the interaction servers 118, from a particular interaction client 104 to another interaction client 104, the communication of media files (e.g., images or video) from an interaction client 104 to the interaction servers 118, the settings of a collection of media data (e.g., a story), the retrieval of a list of friends of an end-user of a user system 102, the retrieval of messages and content, the addition and deletion of entities (e.g., friends) to an entity relationship graph (e.g., a social graph), the location of friends within a social graph, and opening an application event (e.g., relating to the interaction client 104).

The interaction server(s) 118 host multiple systems and subsystems, described below with reference to FIG. 2.

System

Figure 2:
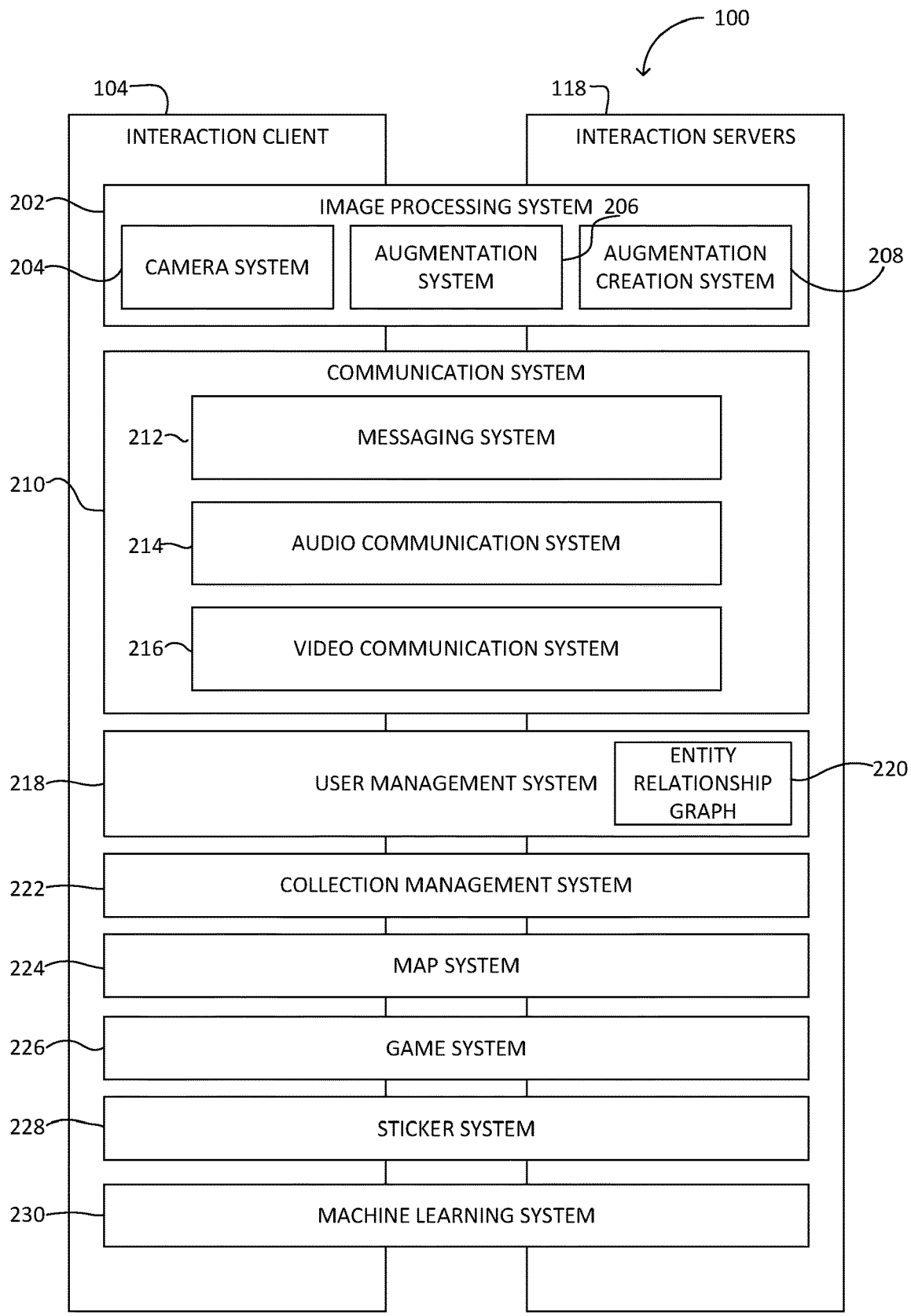
FIG. 2 is a diagrammatic representation of an interaction system that has both client-side and server-side functionality, and with which a messaging application, consistent with some examples, may be deployed.

FIG. 2 is a block diagram illustrating further details regarding the interaction system 100, according to some examples. Specifically, the interaction system 100 is shown to comprise the interaction client 104 and the interaction servers 118. The interaction system 100 embodies multiple subsystems, which are supported on the client-side by the interaction client 104 and on the server-side by the interaction servers 118. Example subsystems are discussed below.

An image processing system 202 provides various functions that enable an end-user to capture and augment (e.g., annotate or otherwise modify or edit) media content associated with a message. A camera system 204 includes control software (e.g., in a camera application) that interacts and controls an image sensor or camera device (e.g., directly or via operating system controls) of the user system 102 to modify and augment real-time images captured by the image sensor and displayed via the interaction client 104. The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of a user system 102. These augmentations are selected by the augmentation system 206 and presented to an end-user of an interaction client 104, based on a number of inputs and data, such as, for example:

Geolocation of the user system 102; and

Social network information of the end-user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 210, such as the messaging system 212 and the video communication system 216.

A media overlay may include text or image data that can be overlaid on top of a photograph taken by the user system 102. or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 120 and accessed through the database server 116.

The image processing system 202 provides an end-user-based publication platform that enables end-users to select a geolocation on a map and upload content associated with the selected geolocation. The end-user may also specify circumstances under which a particular media overlay should be offered to other end-users. The image processing system 202 generates a media overlay that includes the uploaded content and associates the uploaded content with the selected geolocation.

The augmentation creation system 208 supports augmented reality developer platforms and includes an application for content creators (e.g., artists and developers) to create and publish augmentations (e.g., augmented reality experiences) of the interaction client 104. The augmentation creation system 208 provides a library of built-in features and tools including, for example custom shaders, tracking technology, templates, to content creators.

In some examples, the augmentation creation system 208 provides a merchant-based publication platform that enables merchants to select a particular augmentation associated with a geolocation via a bidding process. For example, the augmentation creation system 208 associates a media overlay of the highest bidding merchant with a corresponding geolocation for a predefined amount of time.

A communication system 210 is responsible for enabling and processing multiple forms of communication and interaction within the interaction system 100 and includes a messaging system 212, an audio communication system 214, and a video communication system 216. The messaging system 212 is responsible for enforcing the temporary or time-limited access to content by the interaction clients 104. The messaging system 212 incorporates multiple timers (e.g., within an ephemeral timer system 232) that, based on duration and display parameters associated with a message, or collection of messages (e.g., a story), selectively enable access (e.g., for presentation and display) to messages and associated content via the interaction client 104. Further details regarding the operation of the ephemeral timer system 232 are provided below. The audio communication system 214 enables and supports audio communications (e.g., real-time audio chat) between multiple interaction clients 104. Similarly, the video communication system 216 enables and supports video communications (e.g., real-time video chat) between multiple interaction clients 104.

A user management system 218 is operationally responsible for the management of end-user data and profiles, and includes an entity relationship graph 220 that maintains information regarding relationships between end-users of the interaction system 100.

A collection management system 222 is operationally responsible for managing sets or collections of media (e.g., collections of text, image video, and audio data). A collection of content (e.g., messages, including images, video, text, and audio) may be organized into an "event gallery" or a "story." Such a collection may be made available for a specified time period, such as the duration of an event to which the content relates. For example, content relating to a music concert may be made available as a "story" for the duration of that music concert. The collection management system 222 may also be responsible for publishing an icon that provides notification of a particular collection to the user interface of the interaction client 104. The collection management system 222 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 222 employs machine vision (or image recognition technology) and content rules to curate a content collection automatically. In certain examples, compensation may be paid to an end-user to include user-generated content into a collection. In such cases, the collection management system 222 operates to automatically make payments to such end-users to use their content.

A map system 224 provides various geographic location functions, and supports the presentation of map-based media content and messages by the interaction client 104. For example, the map system 224 enables the display of end-user icons or avatars (e.g., stored in profile data 316) on a map to indicate a current or past location of "friends" of an end-user, as well as media content (e.g., collections of messages including photographs and videos) generated by such friends, within the context of a map. For example, a message posted by an end-user to the interaction system 100 from a specific geographic location may be displayed within the context of a map at that particular location to "friends" of a specific end-user on a map interface of the interaction client 104. An end-user can furthermore share his or her location and status information (e.g., using an appropriate status avatar) with other end-users of the interaction system 100 via the interaction client 104, with this location and status information being similarly displayed within the context of a map interface of the interaction client 104 to selected end-users.

A game system 226 provides various gaming functions within the context of the interaction client 104. The interaction client 104 provides a game interface providing a list of available games that can be launched by an end-user within the context of the interaction client 104 and played with other end-users of the interaction system 100. The interaction system 100 further enables a particular end-user to invite other end-users to participate in the play of a specific game by issuing invitations to such other end-users from the interaction client 104. The interaction client 104 also supports audio, video, and text messaging (e.g., chats) within the context of gameplay, provides a leaderboard for the games, and also supports the provision of in-game rewards (e.g., coins and items).

The sticker system 228 provides various sticker functions within the context of the messaging system 212. As described herein, a sticker is a digital graphic, icon, or image used in messaging. A sticker may be placed or added (e.g., at an end-user-defined position) within a message. A sticker may accompany other content (e.g., text and/or images) within a message. Alternatively, a sticker may itself correspond to the entirety of a message. In one or more examples, the sticker system 228 is configured to maintain a collection of stickers that are available for messaging with respect to the messaging client 104. Accordingly, with some examples, in addition to maintaining the stickers, the sticker system may have and maintain a taxonomy, or a hierarchy of categories or tags, used to organize the available stickers. For instance, a sticker identifier or ID, uniquely identifying a specific sticker, may be assigned to one or more categories, by virtue of assigning or associated one or more tags with the sticker ID. Consistent with some examples, the sticker system 228 may implement a sticker reply recommendation feature that is configured to select, from among the collection of available stickers, a recommended set of stickers for use in a reply message. For example, when an end-user is viewing a particular media content item (e.g., a message with media content, a Story, etc.) communicated to the end-user by another end-user, the messaging client 104 may invoke the recommendation service to generate and present a selection of recommended stickers that may be used in a reply message. As described in greater detail below, the sticker reply recommendation feature may utilize a pre-trained machine learned model, which takes as input features various attributes and characteristics of the message that has been received and viewed by the end-user. In addition, the machine learning model may take as input features various attributes and characteristics of the message sender, as well as the message recipient.

Consistent with some examples, the machine learning system 230 utilizes one or more machine learning algorithms to generate a pre-trained machine learning model that can be used to score stickers. Specifically, the machine learning system 230 may utilize a supervised machine learning algorithm to generate a pre-trained model. Once the model has been trained, the model is used to generate relevance scores for stickers, based on input feature provided to the model reflecting various attributes and characteristics of a received message. Accordingly, when an end-user receives a message or media content item, whether that message has been sent directly to the end-user or shared more broadly, for example, as a story that is viewable my many, the pre-trained model is invoked to generate relevance scores used in the selection of stickers that may be recommended for use in a reply to the received message. With some examples, the model may generate relevance scores for each of several tags, where each tag represents a classification or category of stickers. Alternatively, with some examples, a selection algorithm may be used to first select a subset of stickers, and then the model may be used to generate relevance scores for the individual stickers. The training stage, during which the machine learning model is trained, and the inference stage, during which the machine learning model generates relevance scores for sticker recommendations, are described in greater detail below, in connection with FIG. 6

Data Architecture

Figure 3:
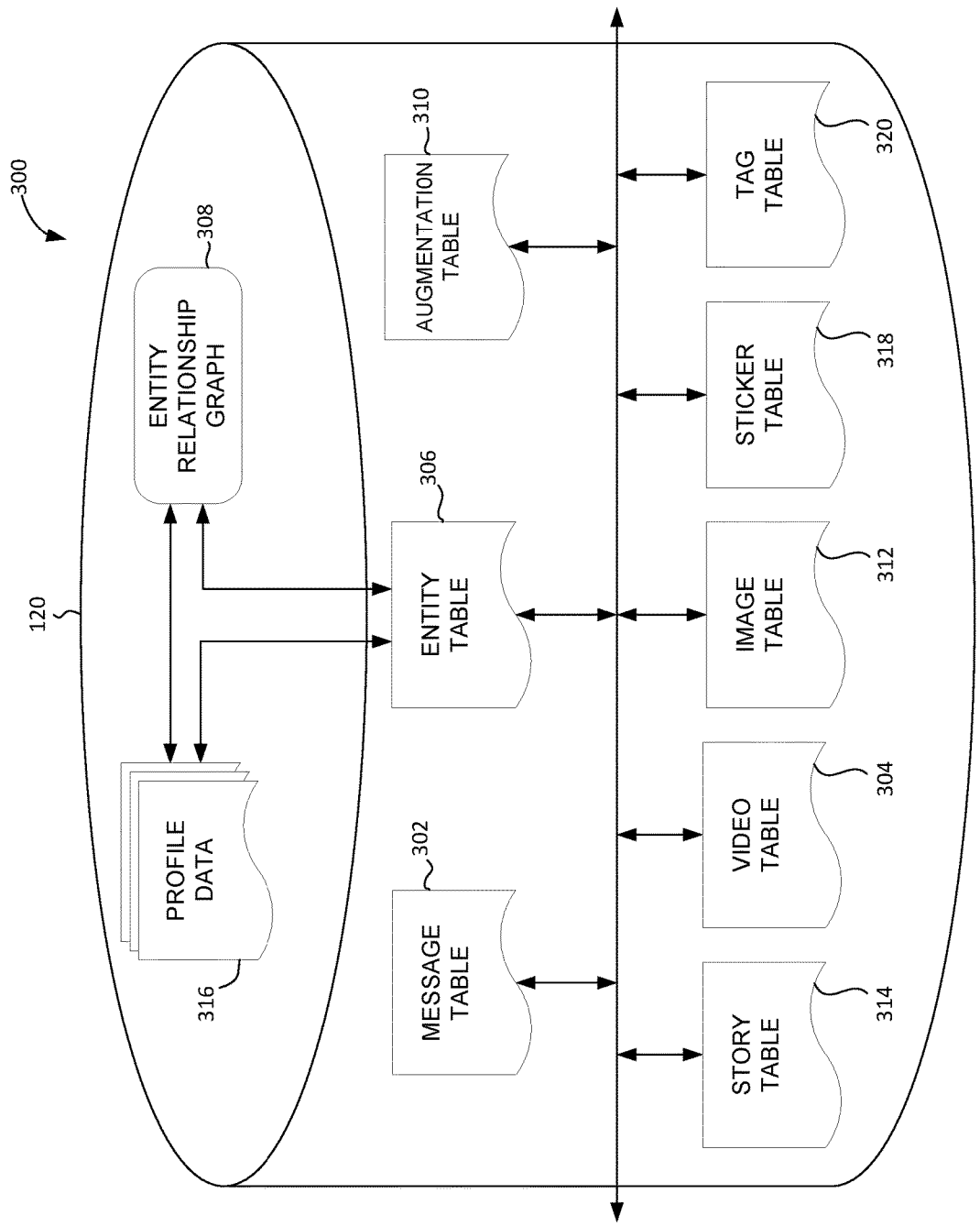
FIG. 3 is a diagrammatic representation of a data structure as maintained in a database, in accordance with some examples.

FIG. 3 is a schematic diagram illustrating data structures 300, which may be stored in the database 120 of the interaction server system 108, according to certain examples. While the content of the database 120 is shown to comprise multiple tables, it will be appreciated that the data could be stored in other types of data structures (e.g., as an object-oriented database, or a graph-based database).

The database 120 includes message data stored within a message table 302. This message data includes, for any particular message, at least message sender data, message recipient (or receiver) data, and a payload (e.g., content of the message). Further details regarding information that may be included in a message, and included within the message data stored in the message table 302, are described below with reference to FIG. 4.

An entity table 306 stores entity data, and is linked (e.g., referentially) to an entity relationship graph 308 and profile data 316. Entities for which records are maintained within the entity table 306 may include individuals, corporate entities, organizations, objects, places, events, and so forth. Regardless of entity type, any entity regarding which the interaction server system 108 stores data may be a recognized entity. Each entity is provided with a unique identifier, as well as an entity type identifier (not shown).

The entity relationship graph 308 stores information regarding relationships and associations between entities. Such relationships may be social, professional (e.g., work at a common corporation or organization), interest-based, or activity-based, merely for example. Certain relationships between entities may be unidirectional, such as a subscription by an individual end-user to digital content of a commercial or publishing end-user (e.g., a newspaper or other digital media outlet, or a brand). Other relationships may be bidirectional, such as a "friend" relationship between individual end-users of the interaction system 100.

Certain permissions and relationships may be attached to each relationship, and also to each direction of a relationship. For example, a bidirectional relationship (e.g., a friend relationship between individual end-users) may include authorization for the publication of digital content items between the individual end-users, but may impose certain restrictions or filters on the publication of such digital content items (e.g., based on content characteristics, location data or time of day data). Similarly, a subscription relationship between an individual end-user and a commercial end-user may impose different degrees of restrictions on the publication of digital content from the commercial end-user to the individual end-user, and may significantly restrict or block the publication of digital content from the individual end-user to the commercial end-user. A particular end-user, as an example of an entity, may record certain restrictions (e.g., by way of privacy settings) in a record for that entity within the entity table 306. Such privacy settings may be applied to all types of relationships within the context of the interaction system 100, or may selectively be applied to certain types of relationships.

The profile data 316 stores multiple types of profile data about a particular entity. The profile data 316 may be selectively used and presented to other end-users of the interaction system 100 based on privacy settings specified by a particular entity. Where the entity is an individual, the profile data 316 includes, for example, an end-user name, telephone number, address, settings (e.g., notification and privacy settings), as well as a user-selected avatar representation (or collection of such avatar representations). A particular end-user may then selectively include one or more of these avatar representations within the content of messages communicated via the interaction system 100, and on map interfaces displayed by interaction clients 104 to other end-users. The collection of avatar representations may include "status avatars," which present a graphical representation of a status or activity that the end-user may select to communicate at a particular time.

Where the entity is a group, the profile data 316 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 304) and images (for which data is stored in an image table 312).

Filters, in some examples, are overlays that are displayed as overlaid on an image or video during presentation to a recipient end-user. Filters may be of various types, including end-user-selected filters from a set of filters presented to a sending user by the interaction client 104 when the sending end-user is composing a message. Other types of filters include geolocation filters (also known as geo-filters), which may be presented to a sending end-user based on geographic location. For example, geolocation filters specific to a neighborhood or special location may be presented within an end-user interface by the interaction client 104, based on geolocation information determined by a Global Positioning System (GPS) unit of the end-user system 102.

Another type of filter is a data filter, which may be selectively presented to a sending end-user by the interaction client 104 based on other inputs or information gathered by the end-user system 102 during the message creation process. Examples of data filters include current temperature at a specific location, a current speed at which a sending end-user is traveling, battery life for an end-user of the system 102, or the current time.

Other augmentation data that may be stored within the image table 312 includes augmented reality content items (e.g., corresponding to applying "lenses" or augmented reality experiences). An augmented reality content item may be a real-time special effect and sound that may be added to an image or a video.

A story table 314 stores data regarding collections of messages and associated image, video, or audio data, which are compiled into a collection (e.g., a story or a gallery). The creation of a particular collection may be initiated by a particular end-user (e.g., each end-user for which a record is maintained in the entity table 306). An end-user may create a "personal story" in the form of a collection of content that has been created and sent/broadcast by that end-user. To this end, the user interface of the interaction client 104 may include an icon that is user-selectable to enable a sending end-user to add specific content to his or her personal story.

A collection may also constitute a "live story," which is a collection of content from multiple end-users that is created manually, automatically, or using a combination of manual and automatic techniques. For example, a "live story" may constitute a curated stream of end-user-submitted content from various locations and events. End-users whose client devices have location services enabled and are at a common location event at a particular time may, for example, be presented with an option, via a user interface of the interaction client 104, to contribute content to a particular live story. The live story may be identified to the end-user by the interaction client 104, based on his or her location. The end result is a "live story" told from a community perspective.

A further type of content collection is known as a "location story," which enables an end-user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 304 stores video data that, in some examples, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The sticker table 318 stores various data relating to digital stickers that may be associated with media content items or messages. By way of example, the sticker table 318 may store for each sticker a unique sticker identifier (ID), which may then be associated with various categories or tags, maintained in the tag table 320. Accordingly, at least with some examples, the sticker table 318, in combination with the tag table 320, may represent a sticker taxonomy, or a hierarchy of categories or tags, by which a collection of digital stickers is organized and maintained. As described in greater detail below, a "smart" reply sticker recommendation feature may utilize a machine learning model to generate relevance scores for stickers, or for the tags associated with the stickers, based on attributes and characteristics of a received message.

Figure 4:
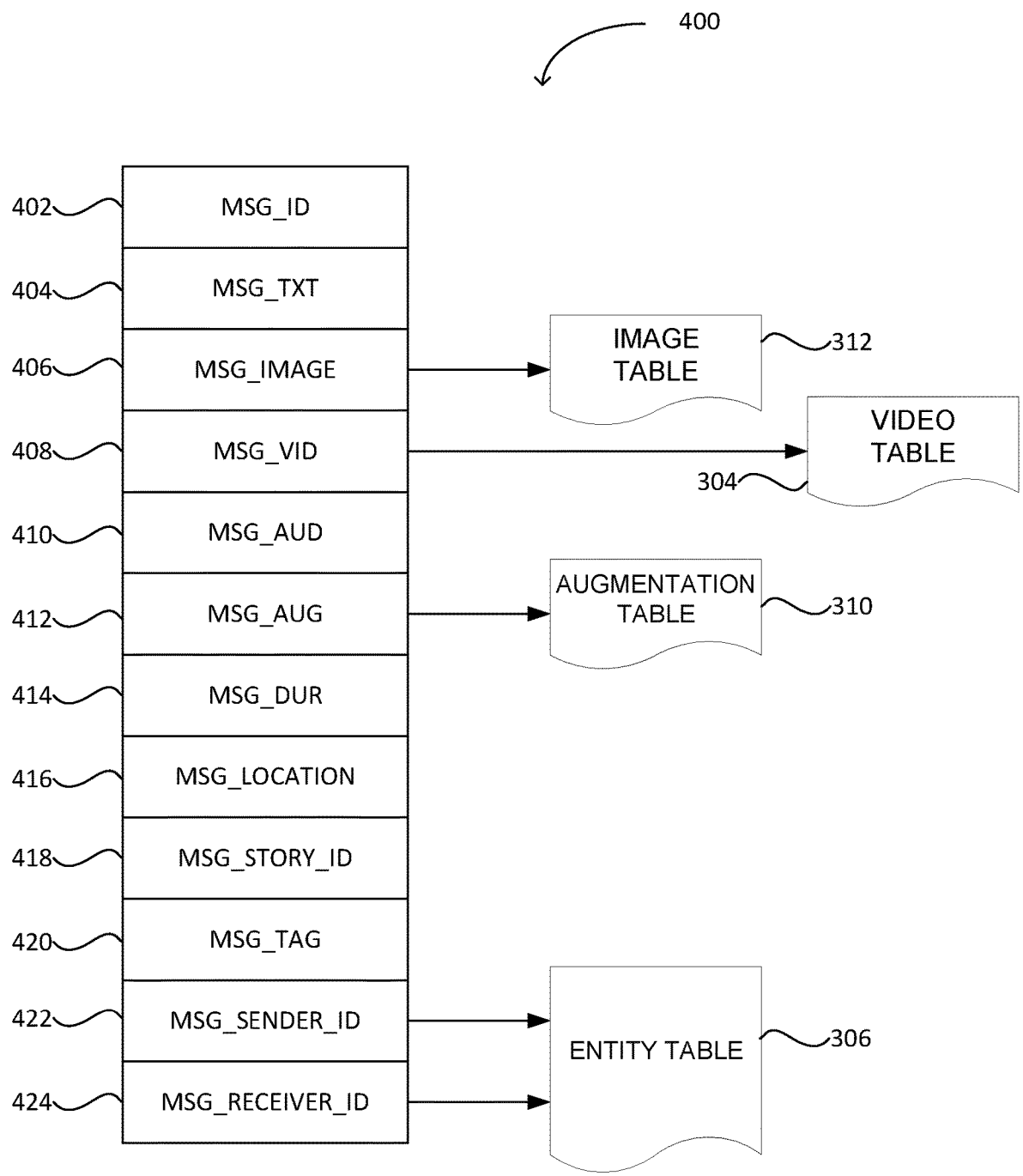
FIG. 4 is a diagrammatic representation of various component parts of a media content item or message, in accordance with some examples.

FIG. 4 is a schematic diagram illustrating a structure of a message 400, according to some examples, generated by a messaging or interaction client 104 for communication to a further messaging or interaction client 104 or the messaging system 212. The content of a particular message 400 is used to populate a record stored in the message table 302 of the database 120, accessible by the messaging system 212. Similarly, the content of a message 400 is stored in memory as "in-transit" or "in-flight" data of the user system 102 or the application or interactions servers 118. A message 400 is shown to include the following example components:

- message identifier 402: a unique identifier that identifies the message 400.
- message text payload 404: text, to be generated by an end-user via a user interface of the user system 102, and that is included in the message 400.
- message image payload 406: image data, captured by a camera component of a user system 102 or retrieved from a memory component of a user system 102, and that is included in the message 400. Image data for a sent or received message 400 may be stored in the image table 316.
- message video payload 408: video data, captured by a camera component or retrieved from a memory component of the user system 102, and that is included in the message 400. Video data for a sent or received message 400 may be stored in the video table 314.
- message audio payload 410: audio data, captured by a microphone or retrieved from a memory component of the user system 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to an end-user via the messaging client 104.
- message geolocation parameter 416: geolocation data (e.g., latitudinal, and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "Stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of an end-user of the user system 102 on which the message 400 was generated and from which the message 400 was sent.

message receiver identifier 424: an identifier (e.g., a messaging system identifier, email address, or device identifier) indicative of an end-user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to end-user records stored within an entity table 304.

Data Flow for Reply Sticker Recommendations

Figure 5:
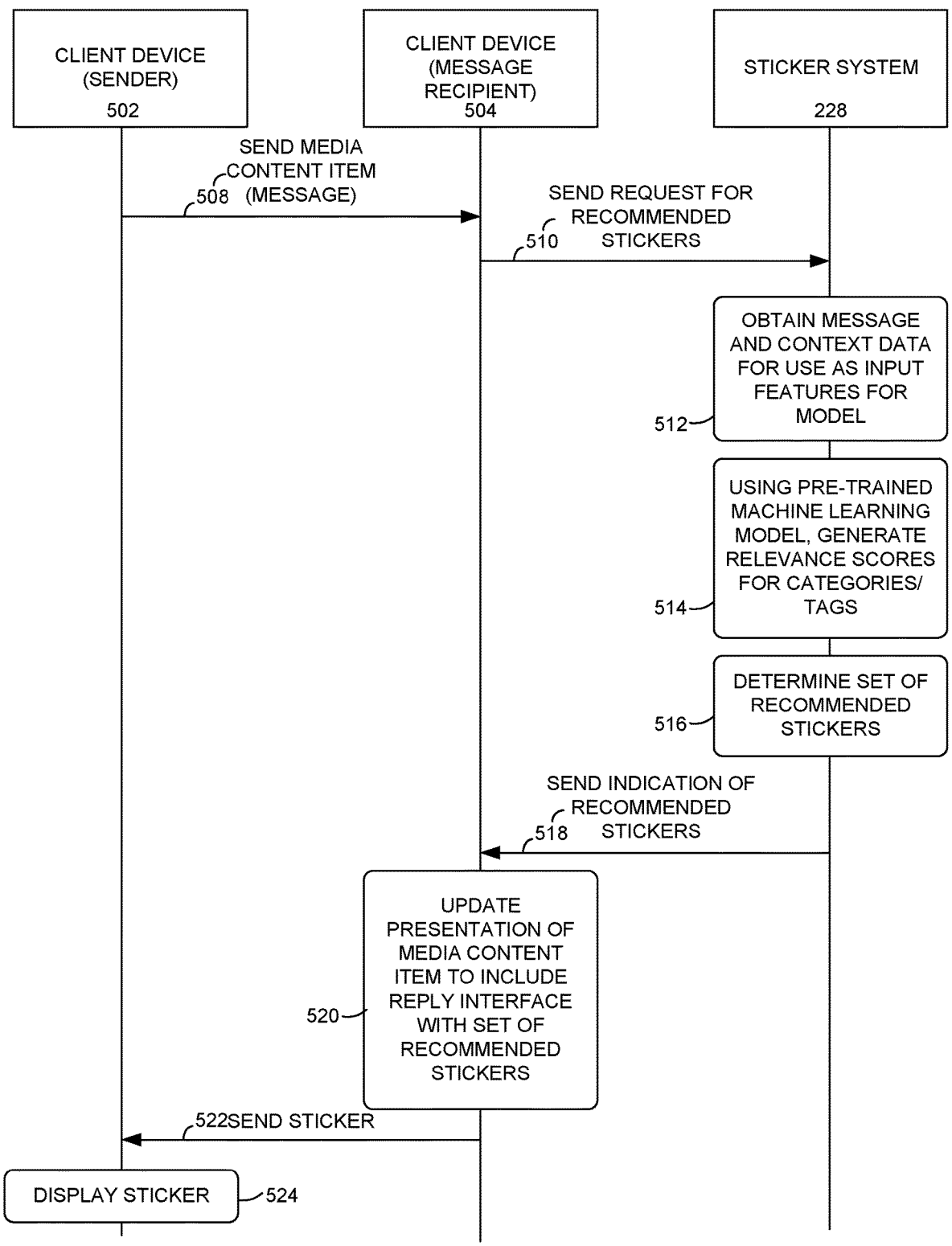
FIG. 5 is an interaction diagram illustrating a process for providing a reply interface with selectable recommended stickers for sending as, or with, a reply message, in accordance with some examples.

FIG. 5 is an interaction diagram illustrating a process for providing a reply interface with selectable recommended stickers for sending as, or with, a reply message, in accordance with some examples. As illustrated in FIG. 5, using a client device 502, a message sender will generate and send a media content item or message 508 to one or more message recipients. Although not shown in FIG. 5, a server associated with the messaging service or system 212 will generally receive the message 508 and then direct the message 508 to the one or more message recipients. As shown here, the message 508 is received by a second client device 504 of the message recipient.

Upon receiving the message 508, and in particular, when the message recipient invokes the messaging or interaction client 104 to view the message 508, the messaging or interaction client 104 of the client device 504 will communicate a request 510 to the sticker system 228 for recommended stickers that might be used as, or with, a reply message. As shown with reference number 512, the sticker system 228 will process the request 510 by obtaining contextual data relating to the original message 508 sent from client device 502 of the message sender, to the client device 504 of the message recipient. Here, the contextual data may include various attributes and characteristics of the original message 508, attributes and characteristics of the message sender, and attributes and characteristics of the message recipient. Specific examples of the contextual data are described in greater detail in connection with the description of FIG. 6. As shown with reference number 516, the obtained contextual data is then processed for use as input features for the pre-trained machine learning model, which will output relevance scores used in selecting stickers to present as recommended reply stickers.

Once the contextual data has been obtained, the contextual data is provided as input features to a pre-trained machine learning model, which generates, as output, relevance scores for use in selecting stickers to recommend as possible reply stickers. With some examples, the relevance scores output by the machine learning model may be associated with specific tags, such that the recommended stickers may be selected for recommending to the message recipient based on those stickers being assigned to or associated with tags that have relevance scores exceeding some threshold, as determined by the model. Accordingly, with reference to 516, the sticker system 228 may select some predetermined number of stickers associated with one or more tags having relevance scores, as determined by the output of the pre-trained machine learning model, which exceed some threshold. With some examples, the final determination of the recommended stickers may be driven in part by the relevance scores, but also taking into consideration other input data.

The sticker system 228, after identifying the stickers to recommend as reply stickers, will communicate an indication of the recommended stickers to the client device 504 of the message recipient. For instance, with some examples, the indication is a sticker ID for each sticker being recommended as a reply message. Accordingly, the messaging or interaction client 104 of the client device 504 will update the presentation of the original media content item or message 508 by presenting with the original message a reply interface that includes a user-selectable sticker for each of the several stickers identified a recommended reply stickers.

Upon determining that the message recipient has selected a specific sticker, the selected sticker is sent 522 to the client device 502 of the sender of the original message, where the sticker is displayed 524. In some instances, the reply sticker may be the entire reply—that is, the sticker may be the reply message. However, in other instances, the selected reply sticker may be communicated with a media content item or message that includes other component parts—for example, images and/or video, text, and so forth. Accordingly, at least in some instances, the selected reply sticker may be positioned by the end-user within another image or video included with the reply message.

With some examples, the sticker system 228 may be a distributed system, such that the sticker system 228 may reside in part on each client system or device 102. Accordingly, at least with some examples, the pre-trained machine learning model may generate the relevance scores for selecting stickers at the client device or system. Alternatively, with some examples, the pre-trained machine learning model may reside server-side, such that the relevance scores are generated server-side, and communicated to a client device or system 102.

Machine Learning

Figure 6:
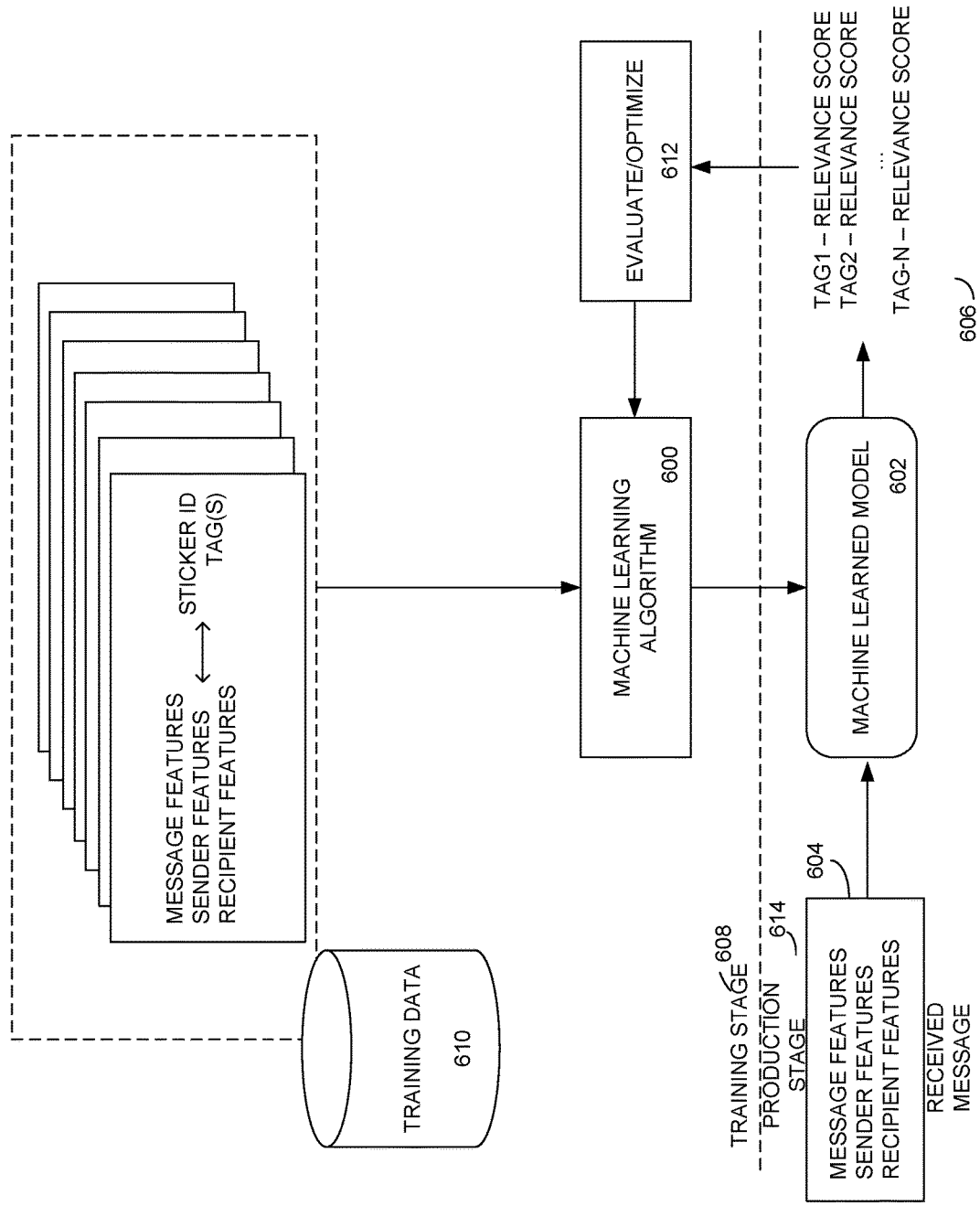
FIG. 6 is a diagram illustrating a process for training a machine learning model to generate relevance scores for stickers, consistent with some examples.

FIG. 6 illustrates an example of how a machine learning algorithm 600—specifically, a supervised machine learning algorithm—may be used to train a machine learning model 602 to receive, as input features, various attributes and characteristics of a received message, and generate as output, relevance scores for use in selecting recommended reply stickers, according to some examples. Consistent with some examples, a supervised machine learning algorithm 600 may be used to train a machine learning model 602 to generate as output, a relevance score for each sticker, or for each category or tag of a sticker taxonomy. For example, in some instances, the output 606 of a model 602 may be a relevance score associated with category or tag to which stickers are assigned or otherwise associated with. Accordingly, the relevance score for any particular tag, as output by the model, is an indication of the likelihood that a message recipient would be interested in selecting a sticker associated with the tag as a reply sticker. In other examples, the relevance score may be associated with individual stickers.

As illustrated in FIG. 6, during a training stage 608, a machine learning algorithm 600 or training system is provided with example, annotated, or labeled data (e.g., training data 610), with the objective of learning a function (e.g., as represented by the model 602) that will map the example inputs to the example outputs. The example inputs and outputs that are used to train the model 602 are generally referred to as the training data 610. In this instance, the training data 610 are historical data that have been observed over some prior time period. Specifically, the historical data comprises a mapping of various message features, sender features, and recipient features, for a specific message, to a tag or sticker ID, associated with a sticker that was sent in reply to the specific message. By way of example, the message features (e.g., attributes and characteristics of a received message) may include any one or more of the message components described in connection with FIG. 4. For instance, the text included in a caption of a message may be used as a message feature in training the machine learning model 602. By way of example, by using the text included with a message, the model 602 may be trained to identify a relationship between certain words (e.g., "birthday") and specific stickers, or specific categories/tags of stickers. In addition to text, the location of the client device when the message was sent may also be a message feature used to train the machine learning model 602. Accordingly, the model 602 may learn the relevance or relationship between certain locations and specific stickers or categories (e.g., tags) of stickers. Other message features used in training the model 602 include the day and/or time at which a message was sent, the category or tag associated with any sticker included with a message, and any augmentation effect (e.g., filter or lens) used with an image or video included with the message.

With some examples, in addition to message features, each individual instance of training data may also include sender features and/or recipient features. Here, sender features are attributes and characteristics of the sender of the message, while recipient features are attributes and characteristics of a message recipient. These features may include information from the respective profiles of each end-user (e.g., sender or recipient), including information concerning the age or birthdate of the end-user, current or typical location of the end-user, and such.

During the training stage 608, after each instance of training data is processed by the machine learned model 602 to generate the output(s) 606 for the input features, an evaluation or optimization operation 612 is performed to determine how to manipulate the function (e.g., the weights) of the machine learned model 602 to generate more accurate predictions—that is, relevance scores. For example, the evaluation operation generally involves comparing the predicted output of the machine learned model 602 with the actual output associated with the example input. A loss function is used to evaluate the performance of the model in generating the desired outputs, based on the provided inputs.

During the training stage 608, as the training data are provided to the learning system 600, the weights of the individual neurons of a neural network model 602 are manipulated to minimize or reduce the error or difference, as measured by a loss function. Once fully trained and deployed in a production setting 614, the model 602 is provided with message features, and optionally sender/recipient features, associated with a specific message sent by a sender to a recipient. The features are then provided as inputs to the machine learning model, which generates a relevance score for each category/tag associated with a sticker taxonomy, or alternatively, for each individual sticker.

User Interface

Figure 7:
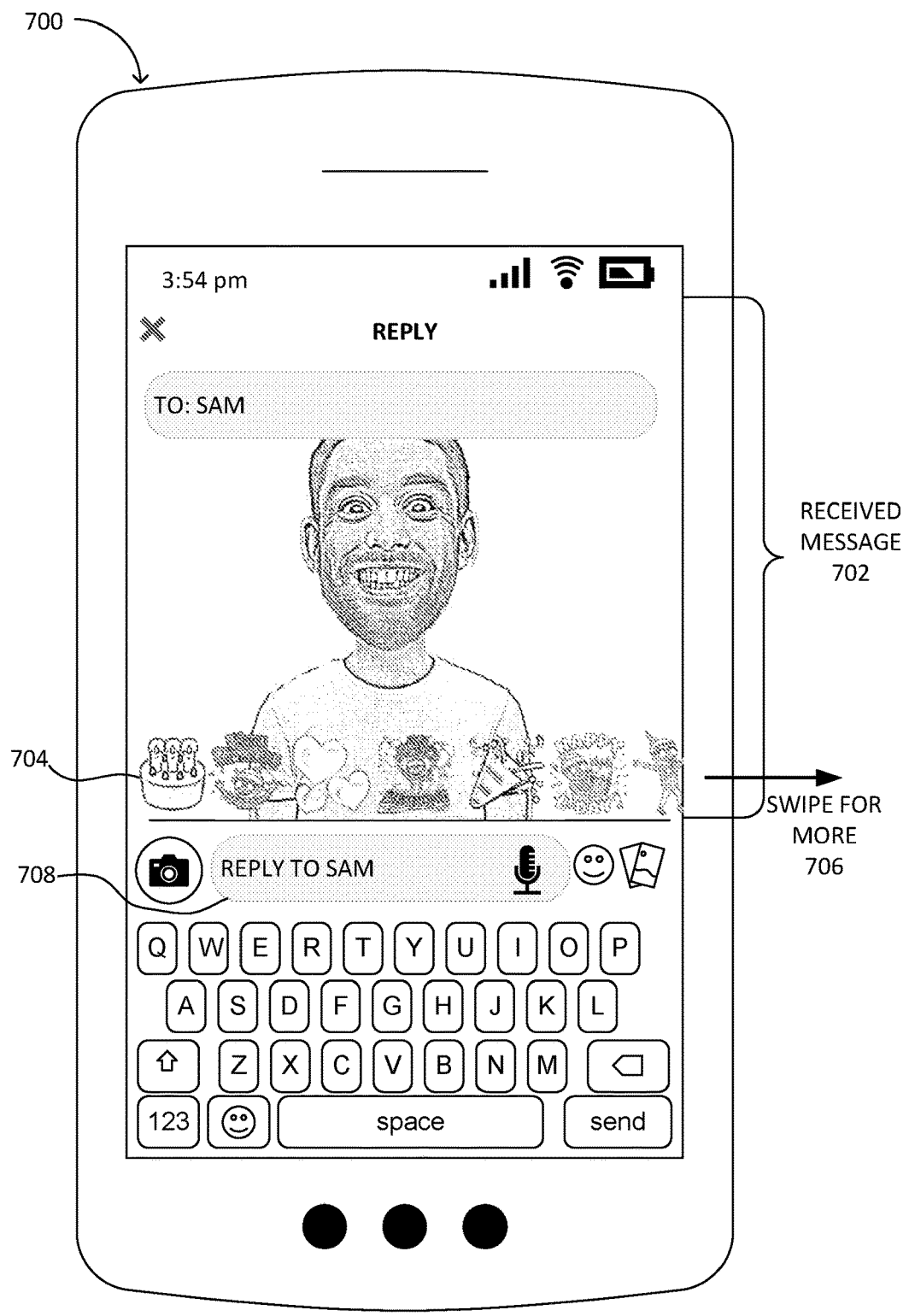
FIGS. 7 and 8 are user interface diagrams illustrating examples of various user interfaces presenting recommended stickers to a message recipient, consistent with some examples.

FIG. 7 is a user interface diagram illustrating one example of a received message being presented via the display of a mobile computing device 700 with a reply interface that is populated with recommended reply stickers, consistent with some examples. In the example of FIG. 7, the display of the mobile computing device 700 is shown presenting a received message 702, sent by an end-user (e.g., "SAM"), and being viewed by another end-user—the message recipient. In this example, the sticker system has processed the received message 702 and relevant contextual data, and has selected a set of recommended reply stickers, which are presented in a row, ordered from left to right based on their overall relevance score. For example, the sticker with reference number 704 is in the first position as a result of having the highest overall relevance score. Of course, in various alternative examples, different presentation formats are possible.

Consistent with some examples, a predetermined number (e.g., between ten and twenty) recommended reply stickers are presented in the reply interface. As indicated by the arrow with reference number 706, the recommended reply stickers may be presented in a carousel, or similar user interface element, enabling the end-user to navigate the recommended reply stickers, for example, by swiping the reply interface to the left and/or right. Consistent with some examples, in addition to presenting some predetermined number of recommended reply stickers, the reply interface may also present some number of default reply stickers (not shown). For example, the default reply stickers may be selected for presentation by some default rule- and not selected based on the pre-trained model.

Consistent with some examples, upon selecting a recommended reply sticker from the reply interface, the sticker will automatically populate the input field 708 and be ready for sending. IN this way, the end-user can select a recommended reply sticker and send it with some additional text provided by the end-user. However, with some alternative examples, upon selecting a recommended reply sticker from the reply interface, the sticker will automatically be sent as a reply message, without any additional text.

Figure 8:
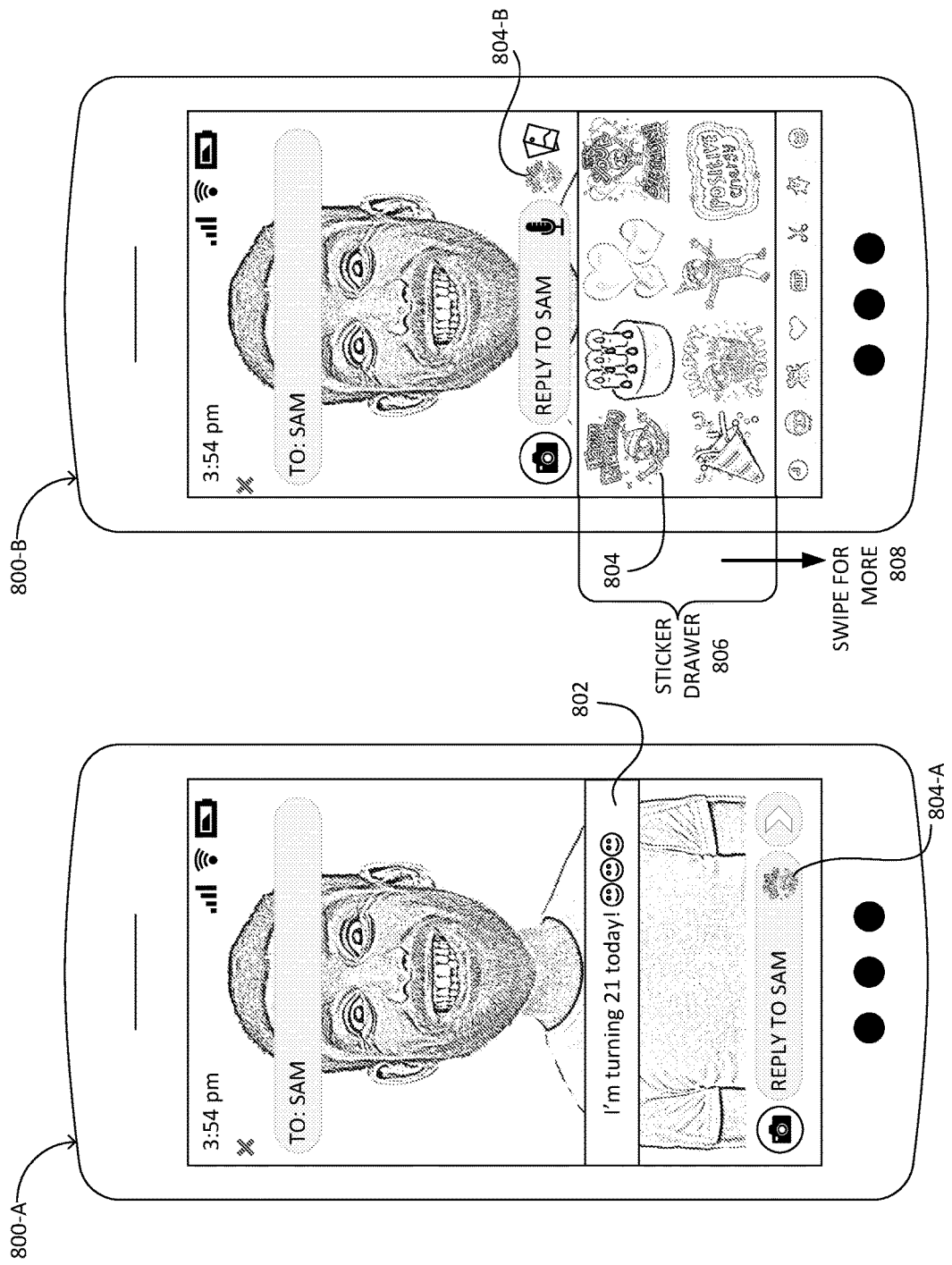

FIG. 8 illustrates an example of a user interface for a messaging application executing on a mobile computing device, before 800-A and after 800-B an end-user has selected a quick (sticker) search icon 804-A. In this example, as shown with reference 800-A, a messaging application executing on a mobile computing device 800-A is presenting to a message recipient a message as received from another end-user (e.g., "SAM"). In this example, the message includes text in a caption (e.g., "I'm turning 21 today!") 802. Accordingly, the text is one of several message-related features that are provided to a pre-trained machine learning model for purposes of generating relevance scores for selecting recommended reply stickers. In this particular example, the sticker icon with reference number 804-A is a quick search icon, indicating that some number of recommended reply stickers have been identified and are available for selection. The sticker 804 that has the highest relevance score, as determined by the sticker system and the machine learned model, is used as the icon for the quick search icon 804-A and 804-B. Accordingly, after the message recipient selects the quick search icon 804-A, a user interface element 806 referred to herein as a sticker drawer 806 is presented, as shown on mobile computing device 800-B. The sticker drawer is populated with a selection of recommended reply stickers, selected using the pre-trained machine learned model. However, at least with some examples, the end-user can swipe or scroll to navigate the sticker drawer 806 and view more user-selectable reply stickers, including stickers that have not been recommended. For example, some predetermined number of recommended reply stickers are presented at the top of the sticker drawer 806, ordered based on their respective relevance scores. However, by swiping or scrolling, the end-user can view additional stickers.

Machine Architecture

Figure 9:
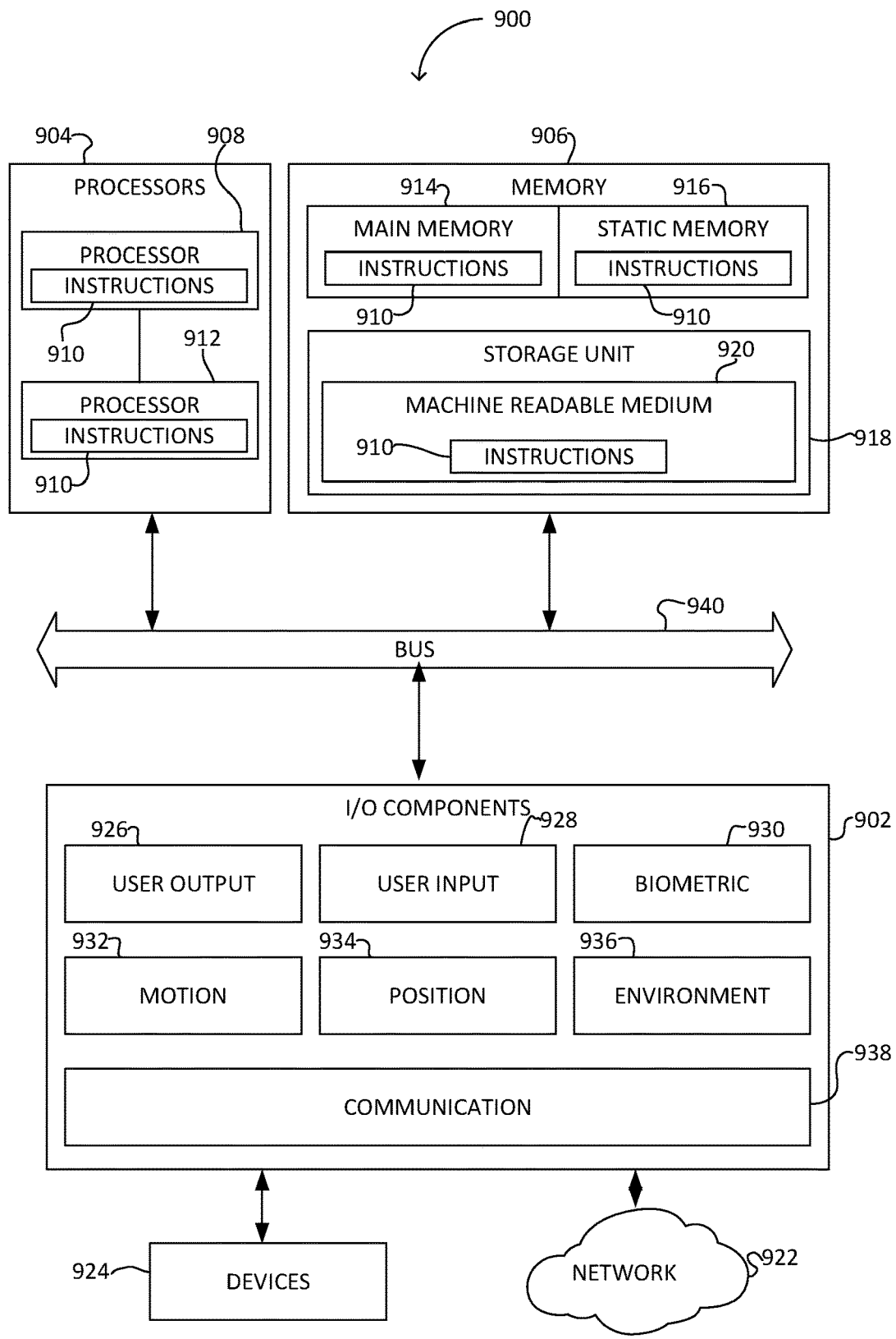
FIG. 9 is a diagrammatic representation of a machine in the form of a computer system within which a set of instructions may be executed for causing the machine to perform any one or more of the methodologies discussed herein, according to some examples.

FIG. 9 is a diagrammatic representation of a machine 900 within which instructions 910 (e.g., software, a program, an application or app, a mini-app, an applet, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine (e.g., client computing device) in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while a single machine 900 is illustrated, the term "machine" shall also be taken to include a collection of machines that individually or jointly execute the instructions 910 to perform any one or more of the methodologies discussed herein. The machine 900, for example, may comprise the user system 102 or any one of multiple server devices forming part of the interaction server system 108. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, all accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include end-user output components 926 and end-user input components 928. The end-user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The end-user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 830, motion components 932, environmental components 936, or position components 934, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The environmental components 936 include, for example, one or more image sensors or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system 204 comprising, for example, front cameras on a front surface of the user system 102 and rear cameras on a rear surface of the user system 102. The front cameras may, for example, be used to capture still images and video of an end-user of the user system 102 (e.g., "selfies"), which may then be augmented with augmentation data (e.g., filters) as referenced above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system 204 of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 838 operable to couple the machine 900 to a network 922 or devices 924 via respective coupling or connections. For example, the communication components 938 may include a network interface component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Examples

Example 1 is a computer-implemented method comprising: receiving, by a first device of a first end-user, a media content item communicated by a second device of a second end-user; generating, at the first device of the first end-user, a reply interface including a set of stickers for use in a reply to the received media content item, by: using a pre-trained machine learned model to derive a plurality of relevance scores for a plurality of stickers, the pre-trained model using as input one or more features relating to the media content item; selecting from the plurality of stickers the set of stickers associated with relevance scores that exceed a threshold; and displaying, by the first device, the media content item together with the reply interface, the reply interface including the set of stickers, each sticker in the set of stickers selectable by the first end-user for sending to the second device, as a reply to the received media content item.

In Example 2, the subject matter of Example 1 includes, wherein deriving the plurality of relevance scores for the plurality of stickers using the pre-trained machine learned model further comprises providing as input to the pre-trained machine learned model a plurality of features including text of a message included with the received media content item.

In Example 3, the subject matter of Examples 1-2 includes, wherein deriving the plurality of relevance scores for the plurality of stickers using the pre-trained machine learned model further comprises providing as input to the pre-trained machine learned model a plurality of features including data indicating a category associated with a sticker included with the received media content item.

In Example 4, the subject matter of Examples 1-3 includes, wherein deriving the plurality of relevance scores for the plurality of stickers using the pre-trained machine learned model further comprises providing as input to the pre-trained machine learned model a plurality of features including data indicating a location from which the received media content item was communicated by the second device of the second end-user.

In Example 5, the subject matter of Examples 1-4 includes, wherein deriving the plurality of relevance scores for the plurality of stickers using the pre-trained machine learned model further comprises providing as input to the pre-trained machine learned model a plurality of features including a date on which the received media content item was communicated by the second device of the second end-user.

In Example 6, the subject matter of Examples 1-5 includes, wherein deriving the plurality of relevance scores for the plurality of stickers using the pre-trained machine learned model further comprises: deriving a relevance score for each of a plurality of categories to which the plurality of stickers are associated; wherein selecting from the plurality of stickers a set of stickers associated with relevance scores that exceed a threshold comprises selecting the plurality of stickers based on category to which each sticker is associated having a relevance score that exceeds the threshold.

In Example 7, the subject matter of Examples 1-6 includes, prior to deriving the plurality of relevance scores for the plurality of stickers using the pre-trained machine learned model, generating the pre-trained machine learned model by training a machine learning model to i) receive, as input, features associated with a received message, and ii) generate, as output, a plurality of relevance scores for use in selecting stickers to recommend as reply stickers, wherein training data used in training the machine learning model comprises historical data relating to reply stickers that were previously selected in response to previously received messages.

Example 8 is an apparatus comprising: a processor; and a memory storage device storing computer-readable instructions thereon, which, when executed by the processor, cause the apparatus to perform operations comprising: receiving, by the apparatus, a media content item communicated by a client device of an end-user; generating, at the apparatus, a reply interface including a set of stickers for use in a reply to the received media content item, by: using a pre-trained machine learned model to derive a plurality of relevance scores for a plurality of stickers, the pre-trained model using as input one or more features relating to the media content item; selecting from the plurality of stickers the set of stickers associated with relevance scores that exceed a threshold; and displaying, by the apparatus, the media content item together with the reply interface, the reply interface including the set of stickers, each sticker in the set of stickers selectable by an end-user of the apparatus for sending to the client device, as a reply to the received media content item.

In Example 9, the subject matter of Example 8 includes, wherein deriving the plurality of relevance scores for the plurality of stickers using the pre-trained machine learned model further comprises providing as input to the pre-trained machine learned model a plurality of features including text of a message included with the received media content item.

In Example 10, the subject matter of Examples 8-9 includes, wherein deriving the plurality of relevance scores for the plurality of stickers using the pre-trained machine learned model further comprises providing as input to the pre-trained machine learned model a plurality of features including data indicating a category associated with a sticker included with the received media content item.

In Example 11, the subject matter of Examples 8-10 includes, wherein deriving the plurality of relevance scores for the plurality of stickers using the pre-trained machine learned model further comprises providing as input to the pre-trained machine learned model a plurality of features including data indicating a location from which the received media content item was communicated by the client device of the end-user.

In Example 12, the subject matter of Examples 8-11 includes, wherein deriving the plurality of relevance scores for the plurality of stickers using the pre-trained machine learned model further comprises providing as input to the pre-trained machine learned model a plurality of features including a date on which the received media content item was communicated by the client device of the end-user.

In Example 13, the subject matter of Examples 8-12 includes, wherein deriving the plurality of relevance scores for the plurality of stickers using the pre-trained machine learned model further comprises: deriving a relevance score for each of a plurality of categories to which the plurality of stickers are associated; wherein selecting from the plurality of stickers a set of stickers associated with relevance scores that exceed a threshold comprises selecting the plurality of stickers based on category to which each sticker is associated having a relevance score that exceeds the threshold.

In Example 14, the subject matter of Examples 8-13 includes, prior to deriving the plurality of relevance scores for the plurality of stickers using the pre-trained machine learned model, generating the pre-trained machine learned model by training a machine learning model to i) receive, as input, features associated with a received message, and ii) generate, as output, a plurality of relevance scores for use in selecting stickers to recommend as reply stickers, wherein training data used in training the machine learning model comprises historical data relating to reply stickers that were previously selected in response to previously received messages.

Example 15 is a computer-readable storage medium having stored thereon instructions for causing a machine, when executing the instructions, to perform operations comprising: receiving, by a first device of a first end-user, a media content item communicated by a second device of a second end-user; generating, at the first device of the first end-user, a reply interface including a set of stickers for use in a reply to the received media content item, by: using a pre-trained machine learned model to derive a plurality of relevance scores for a plurality of stickers, the pre-trained model using as input one or more features relating to the media content item; selecting from the plurality of stickers the set of stickers associated with relevance scores that exceed a threshold; and displaying, by the first device, the media content item together with the reply interface, the reply interface including the set of stickers, each sticker in the set of stickers selectable by the first end-user for sending to the second device, as a reply to the received media content item.

In Example 16, the subject matter of Example 15 includes, wherein deriving the plurality of relevance scores for the plurality of stickers using the pre-trained machine learned model further comprises providing as input to the pre-trained machine learned model a plurality of features including text of a message included with the received media content item.

In Example 17, the subject matter of Examples 15-16 includes, wherein deriving the plurality of relevance scores for the plurality of stickers using the pre-trained machine learned model further comprises providing as input to the pre-trained machine learned model a plurality of features including data indicating a category associated with a sticker included with the received media content item.

In Example 18, the subject matter of Examples 15-17 includes, wherein deriving the plurality of relevance scores for the plurality of stickers using the pre-trained machine learned model further comprises providing as input to the pre-trained machine learned model a plurality of features including data indicating a location from which the received media content item was communicated by the second device of the second end-user.

In Example 19, the subject matter of Examples 15-18 includes, wherein deriving the plurality of relevance scores for the plurality of stickers using the pre-trained machine learned model further comprises providing as input to the pre-trained machine learned model a plurality of features including a date on which the received media content item was communicated by the second device of the second end-user.

In Example 20, the subject matter of Examples 15-19 includes, having stored thereon additional instructions for causing the machine, when executing the instructions, to perform operations comprising: prior to deriving the plurality of relevance scores for the plurality of stickers using the pre-trained machine learned model, generating the pre-trained machine learned model by training a machine learning model to i) receive, as input, features associated with a received message, and ii) generate, as output, a plurality of relevance scores for use in selecting stickers to recommend as reply stickers, wherein training data used in training the machine learning model comprises historical data relating to reply stickers that were previously selected in response to previously received messages.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Software Architecture

Figure 10:
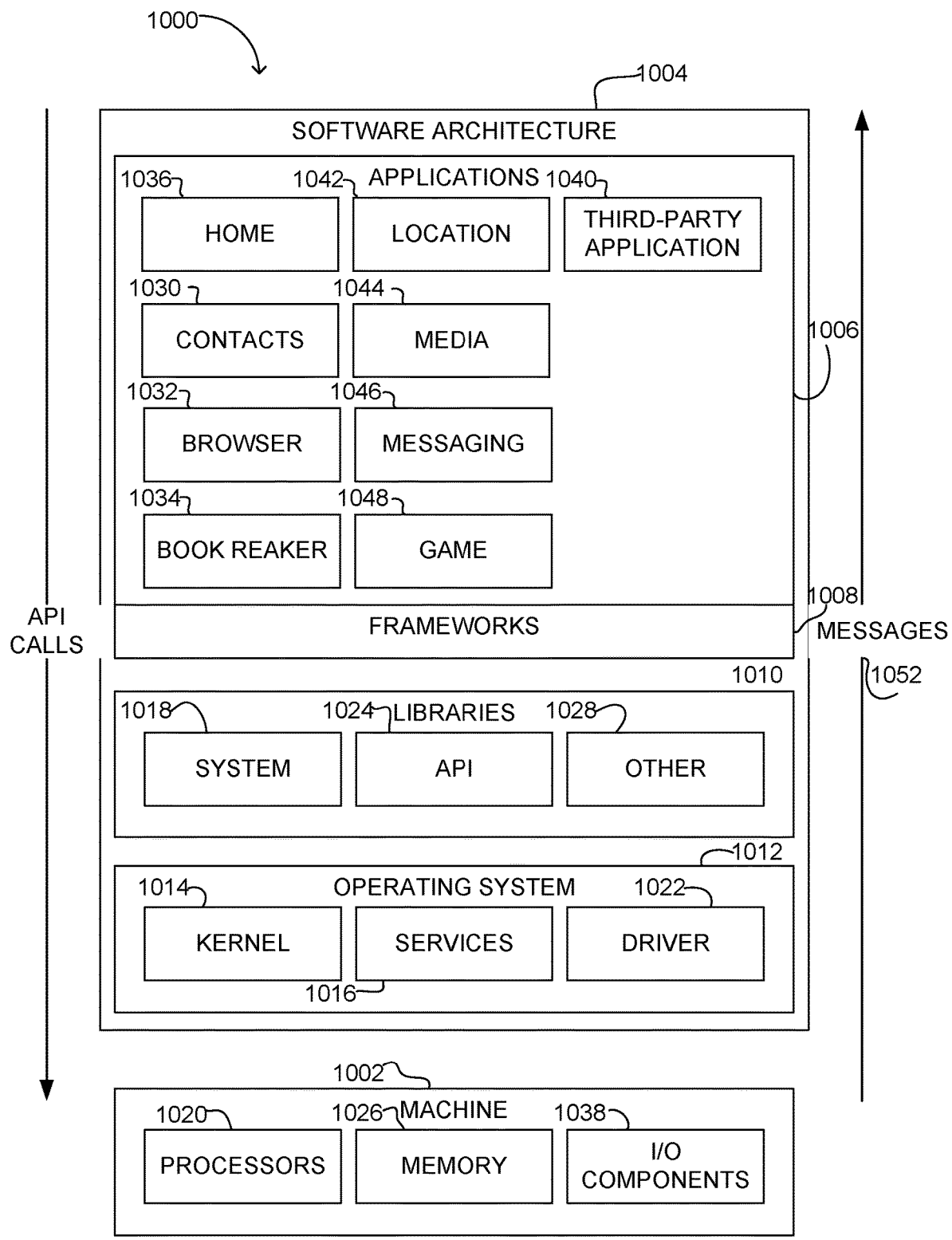
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionalities. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system.

In this example, the third-party application 1040 can invoke the API calls 1050 provided by the operating system 1012 to facilitate functionalities described herein.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine. "Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Sticker" refers to a type of digital image image that may be used to convey emotions, reactions, or messages in a messaging conversation. Stickers are often larger and more expressive than regular emojis, and they may feature characters, illustrations, or animations. Stickers can be sent as standalone messages, or they can be added to a message to enhance its meaning or add a playful element to the conversation. Some messaging applications allow users to download and use custom sticker packs, while others offer a selection of built-in stickers.

"User device" refers, for example, to a device accessed, controlled or owned by a user and with which the user interacts to perform an action or interaction on the user device, including an interaction with other users or computer systems. A user device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that an end-user may use to access a network.

What is claimed is:

1. A computer-implemented method comprising:
    training a machine learning model to generate relevance scores for a plurality of stickers using as training data, historical data, reflecting prior end-user sticker selections in response to received media content items, wherein the historical data includes attributes and characteristics of previously received media content items and the stickers selected by end-users in reply thereto, including augmentation effects applied to images or videos in the media content items;
    subsequent to training the machine learning model:
    receiving, by a first device of a first end-user, a media content item communicated by a second device of a second end-user;
    generating, at the first device of the first end-user, a reply interface including a set of stickers for use in a reply to the received media content item, by:
    using the machine learning model to derive a plurality of relevance scores for a plurality of stickers by analyzing attributes and characteristics of the received media content item, including an indication of an augmentation effect that was applied to an image or video included with the media content item, and using the attributes and characteristics of the received media content item as input to the machine learning model to generate the plurality of relevance scores for the plurality of stickers;
    selecting from the plurality of stickers the set of stickers associated with relevance scores that transgress a threshold; and
    causing display, by the first device, of the media content item with the reply interface, the reply interface including the set of stickers, each sticker in the set of stickers selectable by the first end-user for sending to the second device, as a reply to the received media content item.

2. The computer-implemented method of claim 1, wherein deriving the plurality of relevance scores for the plurality of stickers using the machine learning model further comprises providing as input to the machine learning model a plurality of features including text of a message included with the received media content item.

3. The computer-implemented method of claim 1, wherein deriving the plurality of relevance scores for the plurality of stickers using the machine learning model further comprises providing as input to the machine learning model a plurality of features including data indicating a category associated with a sticker included with the received media content item.

4. The computer-implemented method of claim 1, wherein deriving the plurality of relevance scores for the plurality of stickers using the machine learning model further comprises providing as input to the machine learning model a plurality of features including data indicating a location from which the received media content item was communicated by the second device of the second end-user.

5. The computer-implemented method of claim 1, wherein deriving the plurality of relevance scores for the plurality of stickers using the machine learning model further comprises providing as input to the pre-trained machine learning model a plurality of features including a date on which the received media content item was communicated by the second device of the second end-user.

6. The computer-implemented method of claim 1, wherein deriving the plurality of relevance scores for the plurality of stickers using the machine learning model further comprises:
   deriving a relevance score for each of a plurality of categories to which the plurality of stickers are associated;
   wherein selecting from the plurality of stickers a set of stickers associated with relevance scores that exceed a threshold comprises selecting the plurality of stickers based on category to which each sticker is associated having a relevance score that exceeds the threshold.

7. The computer-implemented method of claim 1, further comprising displaying the set of stickers within a reply interface in a carousel format, wherein each sticker is user-selectable by a single action to immediately send the sticker as a reply message.

8. The computer-implemented method of claim 1, further comprising presenting a selection of default reply stickers within the reply interface, wherein the default reply stickers are displayed alongside the set of stickers based on the relevance scores, and wherein the default reply stickers are selectable by a message recipient to accommodate user preferences independent of received message content.

9. The computer-implemented method of claim 1, wherein the reply interface includes a quick search icon that, upon selection by a message recipient, expands to display the set of stickers, and wherein the quick search icon is visually differentiated based on the highest relevance score of a sticker from the set of stickers.

10. An apparatus comprising:
    a processor; and
    a memory storage device storing computer-readable instructions thereon, which, when executed by the processor, cause the apparatus to perform operations comprising:
    training a machine learning model to generate relevance scores for a plurality of stickers using as training data, historical data, reflecting prior end-user sticker selections in response to received media content items, wherein the historical data includes attributes and characteristics of previously received media content items and the stickers selected by end-users in reply thereto, including augmentation effects applied to images or videos in the media content items;
    subsequent to training the machine learning model:
    receiving, by the apparatus, a media content item communicated by a client device of an end-user;
    generating, at the apparatus, a reply interface including a set of stickers for use in a reply to the received media content item, by:
    using the machine learning model to derive a plurality of relevance scores for a plurality of stickers by analyzing attributes and characteristics of the received media content item, including an indication of an augmentation effect that was applied to an image or video included with the media content item, and using the attributes and characteristics of the received media content item as input to the machine learning model to generate the plurality of relevance scores for the plurality of stickers;
    selecting from the plurality of stickers the set of stickers associated with relevance scores that exceed a threshold; and
    displaying, by the apparatus, the media content item together with the reply interface, the reply interface including the set of stickers, each sticker in the set of stickers selectable by an end-user of the apparatus for sending to the client device, as a reply to the received media content item.

11. The apparatus of claim 10, wherein deriving the plurality of relevance scores for the plurality of stickers using the machine learning model further comprises providing as input to the machine learning model a plurality of features including text of a message included with the received media content item.

12. The apparatus of claim 10, wherein deriving the plurality of relevance scores for the plurality of stickers using the machine learning model further comprises providing as input to the machine learning model a plurality of features including data indicating a category associated with a sticker included with the received media content item.

13. The apparatus of claim 10, wherein deriving the plurality of relevance scores for the plurality of stickers using the machine learning model further comprises providing as input to the machine learning model a plurality of features including data indicating a location from which the received media content item was communicated by the client device of the end-user.

14. The apparatus of claim 10, wherein deriving the plurality of relevance scores for the plurality of stickers using the machine learning model further comprises providing as input to the machine learning model a plurality of features including a date on which the received media content item was communicated by the client device of the end-user.

15. The apparatus of claim 10, wherein deriving the plurality of relevance scores for the plurality of stickers using the machine learning model further comprises:
    deriving a relevance score for each of a plurality of categories to which the plurality of stickers are associated;
    wherein selecting from the plurality of stickers a set of stickers associated with relevance scores that exceed a threshold comprises selecting the plurality of stickers based on category to which each sticker is associated having a relevance score that exceeds the threshold.

16. A computer-readable storage apparatus having stored thereon instructions for causing a machine, when executing the instructions, to perform operations comprising:

training a machine learning model to generate relevance scores for a plurality of stickers using as training data, historical data, reflecting prior end-user sticker selections in response to received media content items, wherein the historical data includes attributes and characteristics of previously received media content items and the stickers selected by end-users in reply thereto, including augmentation effects applied to images or videos in the media content items;

subsequent to training the machine learning model:

receiving, by a first device of a first end-user, a media content item communicated by a second device of a second end-user;

generating, at the first device of the first end-user, a reply interface including a set of stickers for use in a reply to the received media content item, by:

using the machine learning model to derive a plurality of relevance scores for a plurality of stickers by analyzing attributes and characteristics of the received media content item, including an indication of an augmentation effect that was applied to an image or video included with the media content item, and using the attributes and characteristics of the received media content item as input to the machine learning model to generate the plurality of relevance scores for the plurality of stickers;

selecting from the plurality of stickers the set of stickers associated with relevance scores that exceed a threshold; and displaying, by the first device, the media content item together with the reply interface, the reply interface including the set of stickers, each sticker in the set of stickers selectable by the first end-user for sending to the second device, as a reply to the received media content item.

17. The computer-readable storage apparatus of claim 16, wherein deriving the plurality of relevance scores for the plurality of stickers using the machine learning model further comprises providing as input to the machine learning model a plurality of features including text of a message included with the received media content item.

18. The computer-readable storage apparatus of claim 16, wherein deriving the plurality of relevance scores for the plurality of stickers using the machine learning model further comprises providing as input to the machine learning model a plurality of features including data indicating a category associated with a sticker included with the received media content item.

19. The computer-readable storage apparatus of claim 16, wherein deriving the plurality of relevance scores for the plurality of stickers using the machine learning model further comprises providing as input to the machine learning model a plurality of features including data indicating a location from which the received media content item was communicated by the second device of the second end-user.

20. The computer-readable storage apparatus of claim 16, wherein deriving the plurality of relevance scores for the plurality of stickers using the machine learning model further comprises providing as input to the machine learning model a plurality of features including a date on which the received media content item was communicated by the second device of the second end-user.

* * * * *